March 15, 1932.  A. BLACKMAN  1,849,269

ROTARY ENGINE

Filed May 31, 1928  3 Sheets-Sheet 1

Alexander Blackman
INVENTOR

BY Victor J. Evans
ATTORNEY

March 15, 1932. A. BLACKMAN 1,849,269
ROTARY ENGINE
Filed May 31, 1928 3 Sheets-Sheet 2

Alexander Blackman
INVENTOR
BY Victor J. Evans
ATTORNEY

March 15, 1932.　　　A. BLACKMAN　　　1,849,269
ROTARY ENGINE
Filed May 31, 1928　　3 Sheets-Sheet 3
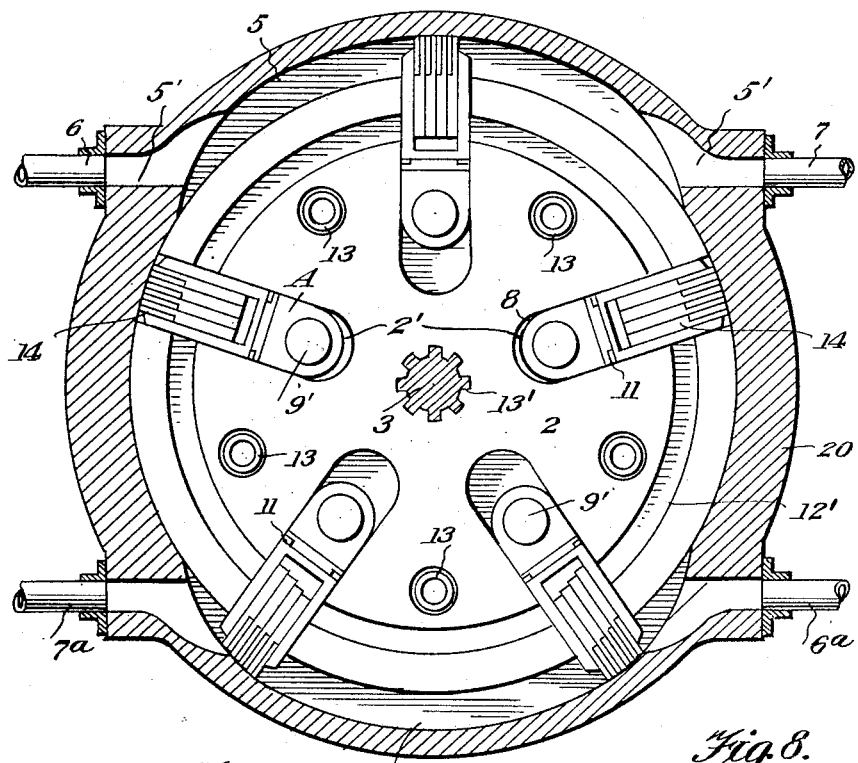
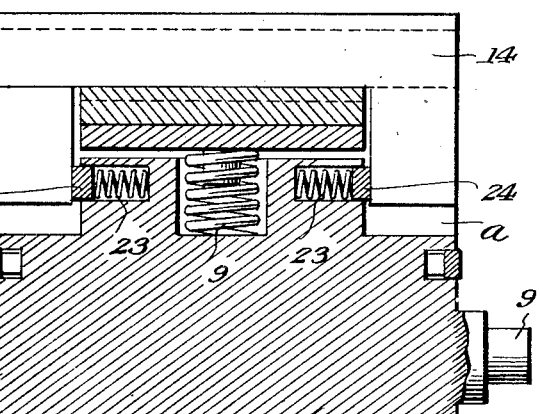
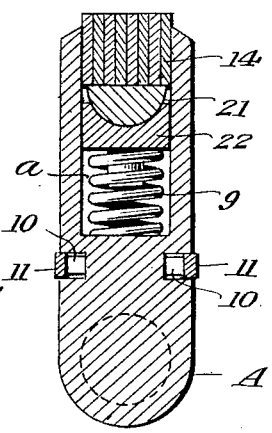
Alexander Blackman
INVENTOR
BY Victor J. Evans
ATTORNEY Patented Mar. 15, 1932

1,849,269

UNITED STATES PATENT OFFICE

ALEXANDER BLACKMAN, OF PENSACOLA, FLORIDA, ASSIGNOR TO PATENT FINANCE AND HOLDING COMPANY, A CORPORATION OF FLORIDA

ROTARY ENGINE

Application filed May 31, 1928. Serial No. 281,875.

This invention relates to a rotary engine for use with expansible fluid, such as steam, compressed air or the like, the general object of the invention being to provide a casing having a pair of expansion chambers therein and a rotor provided with a plurality of radially arranged pistons which are slidably arranged in the rotor and are held against the internal wall of the casing by cam means, with means for introducing the propelling fluid into each chamber so that each piston is acted on twice by the propulsion fluid during each rotation of the rotor, thus providing twice as many impulses as there are pistons.

Another object of the invention is to provide a plurality of spring pressed blades in each piston for providing a steam or airtight joint between each piston and the casing and also to provide spring pressed means between the sides of the rotor and the sides of the casing for preventing leakage between these parts.

A further object of the invention is to provide a distributor for the propulsion fluid which is actuated from the shaft of the rotor in such a manner that the propulsion fluid is delivered to the expansion chambers as the pistons enter said chambers so that the full effect of the fluid is utilized and to provide exhaust means in the distributor for the exhausting of the fluid from the chambers.

A still further object of the invention is to provide means in the distributor for so controlling the ports thereof that the rotor can be made to rotate in either one direction or the other.

Another object of the invention is to so arrange the expansion chambers and their ports that one chamber can be used for the propulsion fluid to actuate the rotor and the other chamber as a pump for causing the pistons passing through this chamber to draw in fluid through one port and discharge it through the other port.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 3 is a vertical sectional view taken at right angles to Figure 2.

Figure 7 is a longitudinal sectional view through one of the pistons, with parts in elevation.

Figure 8 is a transverse sectional view through one of the pistons.

Figure 1:
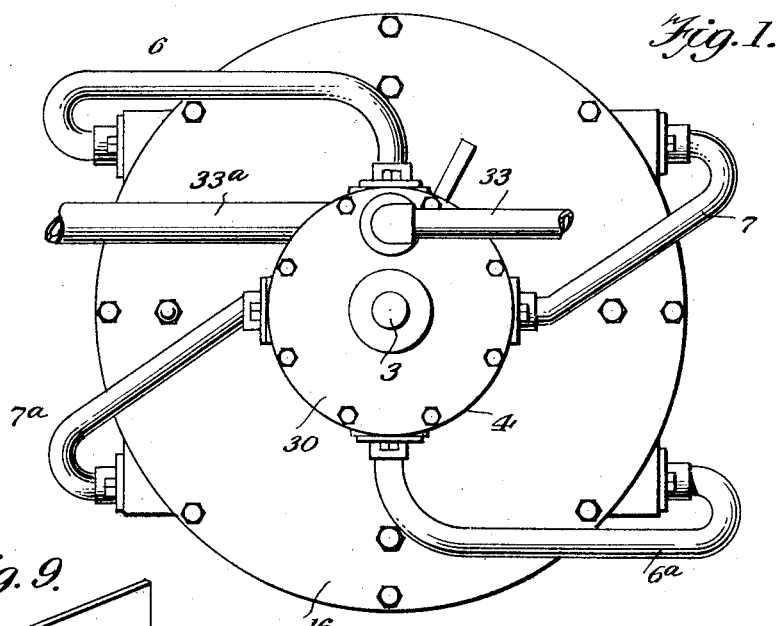
Figure 1 is an elevation of the improved motor.
Figure 9:
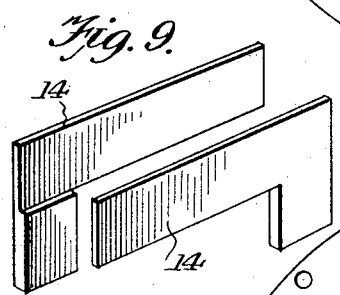
Figure 9 is a perspective view of one pair of piston blades.
Figure 6:
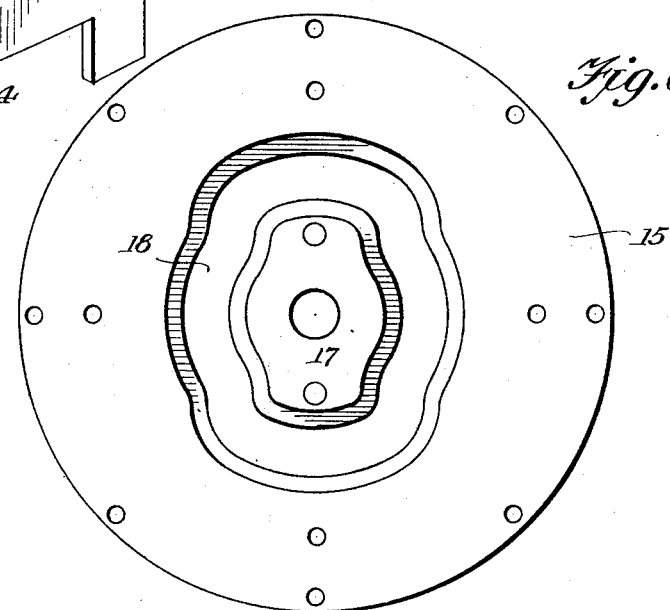
Figure 6 is an inner face view of the one of the end plates of the casing and showing the cam plates thereon.
Figure 2:
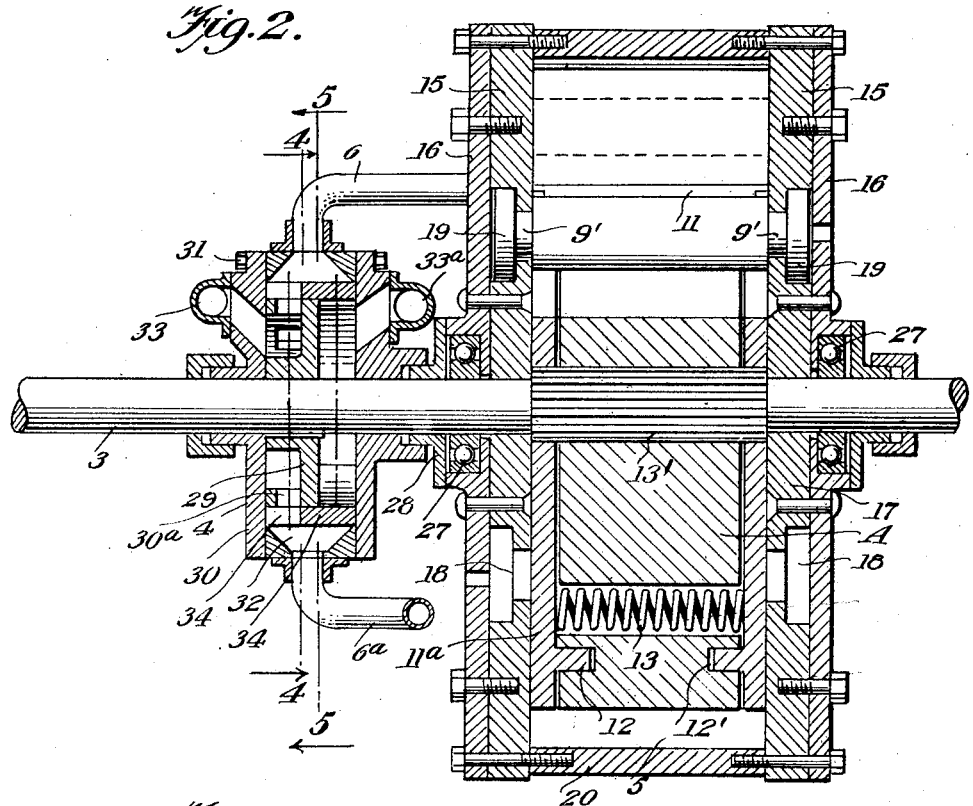
Figure 2 is a longitudinal sectional view.
Figures 4, 5:
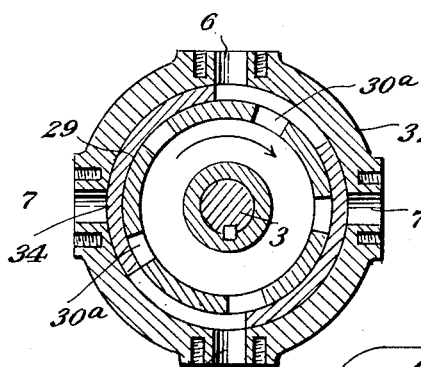
Figure 4 is a section on line 4—4 of Figure 2.
Figure 5 is a section on line 5—5 of Figure 2.
Figure 10:
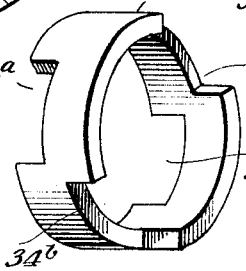
Figure 10 is a perspective view of the reversing ring of the distributor.

As shown in these views, the casing or stator is composed of the end plates 16 and the substantially ring-shaped member 20, with the cam plates 15 and 17 fastened to each end plate, these cam plates forming the cam groove 18 with their adjacent edges countersunk to form a track for the rollers of the pistons. The internal walls of the member 20 are formed with recesses of substantially crescent shape to provide the expansion chambers 5 and, as shown, these chambers are arranged diametrically opposite each other. Ports 5' are formed in the member 20, one adjacent each end of each chamber 5. The rotor 2 is concentrically arranged in the casing or stator and is fastened to the shaft 3 by means of the toothed portions 13', the shaft being journaled in the ends of the casing by the ball bearings 27, the shaft passing through openings formed in the cam plates 17. Plates 11$^a$ are movably arranged at the sides of the rotor by having their annular flanges 12 engaging annular grooves 12' formed in the sides of the rotor and these plates are pressed outwardly against the cam plates by the springs 13 which pass through openings formed in the rotor. These plates act to prevent leakage between the rotor and the cam plates.

Radially arranged slots 2' are formed in the outer portions of the rotor and a piston A is slidably arranged in each slot, the inner end of each slot being rounded, as shown at 8, and the inner end of each piston is also rounded to conform to the rounded end of the slot. Each piston is of substantially elongated rectangular shape and has trunnions 9' at its edges adjacent its inner end which carry the rollers 19 which engage the tracks formed by the cam plates, the trunnions extending through the grooves formed by said plates.

Each piston is formed with a longitudinally extending slot $a$ which is formed with inwardly extending portions at its ends for receiving the L-shaped plates 14. The short arms of these plates or blades lie in the extended portions of the slots, with the long arms extending lengthwise in the slots. The short arms are of greater thickness than the long arms and the plates or blades are arranged in pairs with the free end of the long arm of one blade or plate lying flush with a face of the short arm. A follower 22 is placed in the slot between the short arms of the blades and a spring 9 is placed in the slot and tends to push the follower outwardly. The outer face of the follower has a semi-circular groove therein to receive the curved part of a semi-circular member 21 which bears against the inner edges of the long arms of the blades. Blocks 24 are pressed against the inner edges of the short arms of the blades by the springs 23 and thus the springs 9 and 23 act to hold the blades against the internal walls of the casing so as to form a fluid-tight joint between the pistons and the walls of the casing. The member 21 acts to cause the blades to adjust themselves on the curved walls of the expansion chambers 5 so that a fluid-tight joint is provided between the pistons and the walls of the casing at all times and as the pistons pass to and from the expansion chambers. Each piston is also provided with the packing strips 11 and their springs 10 which are arranged in grooves in the pistons and act in the same manner as the piston rings on a cylindrical type of piston.

Pipes 6 and 7 are connected with the ports 5' of the upper chamber 5 and pipes $6^a$ and $7^a$ are connected with the ports of the lower chamber, so that by connecting the pipes 6 and $6^a$ with a steam supply or the like, the fluid entering the chambers 5 will act on the pistons and thus cause the rotor to revolve, the fluid escaping through the pipes 7 and $7^a$ after the pistons pass said ports. As shown in Figure 3, before a piston passes the exhaust port, another piston will enter the expansion chamber and thus be acted on by the fluid entering the chamber so that the impulses will be practically continuous and by providing the two chambers with their inlet and exhaust means, each piston will be acted on by the fluid twice each revolution of the rotor. By introducing the fluid into the chambers through the pipes 7 and $7^a$ and exhausting the fluid through the pipes 6 and $6^a$, the rotor will be revolved in a reverse direction. By using but one of the chambers for the propulsion fluid, the other chamber can be used as a pump. In this case, the pistons passing through the last mentioned chamber will draw fluid through one pipe and force it through the other pipe.

As will be understood, the pistons will be reciprocated in the slots in the rotor as the rotor revolves by the cam grooves formed by the cam plates 15 and 17, these grooves being so formed as to cause the blades of the pistons to remain in contact with the internal walls of the casing at all times.

The distributor comprises a casing formed of the end plates 4 and the ring-shaped member 32 which are bolted together by the bolts 31. The shaft 3 passes through the center of the casing and said casing is held stationary by a part of the inner plate 30 engaging a boss on a plate 28 which forms part of the stator. The member 32 is formed with four ports which are arranged a quarter turn from each other and to which the pipes 6, $6^a$, 7 and $7^a$ are connected. A ring 34 is rotatably arranged in the distributor and engages the inner wall of the member 32 and a handle 35 is fastened to the ring 34 and extends through a slot in the casing. This ring 34 is formed with the parts $34^a$ which are arranged in one edge of the ring and are diametrically opposite each other and another pair of ports $34^b$ is arranged in the opposite edge of the ring, the latter ports being arranged a quarter turn from the first ports. A rotatable member 29 is placed in the space formed by the ring 34 and is keyed to the shaft 3 and divides the space within the distributor into an exhaust chamber and an inlet chamber, the inlet chamber being connected with a source of supply by the conduit 33 and the exhaust chamber being connected with an exhaust conduit $33^a$. The member 29 is formed with an exterior flange which is formed with the ports $30^a$ which will register with the ports $34^a$ in ring 34 as the member 29 revolves with the shaft. Thus the fluid from the conduit 33 will enter the inlet chamber formed by the member 29 and this fluid will pass through the ports $30^a$ as said ports come into register with the ports $34^a$ and through said ports $34^a$ to the pipes 6 and $6^a$ and into the expansion chambers 5. The fluid exhausting from the expansion chambers will return to the distributor through the pipes 7 and 7ª, the ports 34ᵇ in the ring 34 into the exhaust chamber and then the fluid will pass from the exhaust chamber through the exhaust conduit 33ª. By pulling upon the handle 35, the ring 34 will be moved to its other position so as to place the ports 34ª in communication with the pipes 7 and 7ª so that the fluid will flow into the expansion chambers through the pipes 7 and 7ª and thus reverse the motion of the rotor. Thus it will be seen that it is simply necessary to adjust the ring 34 to cause the rotor to revolve in one direction or the other.

It is thought from the foregoing description that the advantages and novel features of my invention will be readily apparent.

It is to be understood that changes may be made in the construction and in the combination and arrangement of the several parts, provided that such changes fall within the scope of the appended claim.

What I claim is:—

A rotary engine comprising a casing having inlet and exhaust ports, a rotor journaled in the casing and provided at its periphery with radially disposed slots, piston members mounted for sliding movement in the slots, spring pressed followers mounted in the piston members, a series of plates resting upon each follower, said plates being L-shaped and one end portion approximately twice as thick transversely as the other end portions, the thinner end portions of all of the plates overlapping each other and the thicker end portion of each alternate plate engaging each other whereby some of the thicker end portions are located at one end of the piston and the remainder of the thicker end portions of the plates at the opposite end of the piston and spring pressed blocks carried by the piston and bearing against the inner edges of the thicker end portions of the plates.

In testimony whereof I affix my signature.

ALEXANDER BLACKMAN.